(12) United States Patent
Schweitzer et al.

(10) Patent No.: US 9,623,707 B2
(45) Date of Patent: Apr. 18, 2017

(54) TIRE WITH GROOVE REINFORCEMENT

(71) Applicant: The Goodyear Tire & Rubber Company, Akron, OH (US)

(72) Inventors: Claude Schweitzer, Colmar-Berg (LU); Thomas Gesenhoff, Trier (DE); Jean-Louis Marie Félicien Thomas, Waltzing (BE); Hans Leo Bert Geluykens, Attert (BE); Phaniraj Muthigi, Copley, OH (US); Jacques Camille Marie Nevouet, Steinsel (LU); Germain Dehez, Gouvy (BE); Hubert Anna Johanes Cox, Eschdorf (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 261 days.

(21) Appl. No.: 14/566,007

(22) Filed: Dec. 10, 2014

(65) Prior Publication Data

US 2016/0167440 A1 Jun. 16, 2016

(51) Int. Cl.
*B60C 11/00* (2006.01)
*B60C 1/00* (2006.01)
(Continued)

(52) U.S. Cl.
CPC ........ *B60C 11/0041* (2013.04); *B60C 1/0016* (2013.04); *B60C 11/0075* (2013.04);
(Continued)

(58) Field of Classification Search
CPC .................... B60C 11/0041; B60C 11/0075
(Continued)

(56) References Cited

U.S. PATENT DOCUMENTS 5,397,616 A 3/1995 Aoki
5,524,688 A 6/1996 Trares et al.
(Continued)

FOREIGN PATENT DOCUMENTS

DE 102010042836 A1 5/2011
EP 1308319 A1 5/2003
(Continued)

OTHER PUBLICATIONS

JPO machine translation of JP 2009-126314, retrieved Oct. 25, 2016.*

(Continued)

*Primary Examiner* — Timothy Kennedy
(74) *Attorney, Agent, or Firm* — John D. DeLong (57) ABSTRACT

The present invention is directed to a tire comprising a tread comprising: a plurality of circumferential grooves separating circumferential ribs, each groove comprising a bottom and two sidewalls; one or more groove reinforcements, each groove reinforcement laterally spaced from any other of said one or more groove reinforcements; wherein each groove reinforcement is arranged adjacent one circumferential groove; wherein at least one circumferential groove has no groove reinforcement adjacent to it; and wherein each groove reinforcement extends from the radially inner surface of the tread in a radially outward direction at least to the bottom of the adjacent circumferential groove to form at least part of the bottom of that groove.

18 Claims, 5 Drawing Sheets (51) Int. Cl.
*B60C 11/13* (2006.01)
*B60C 11/04* (2006.01)
*B60C 11/03* (2006.01)

(52) U.S. Cl.
CPC .......... *B60C 11/04* (2013.01); *B60C 11/1346* (2013.04); *B60C 11/0058* (2013.04); *B60C 2011/0341* (2013.04)

(58) Field of Classification Search
USPC ...................................................... 152/209.5
See application file for complete search history.

(56) References Cited

U.S. PATENT DOCUMENTS

| | | | |
|---|---|---|---|
| 6,213,181 B1 * | 4/2001 | Janajreh | B60C 11/00 152/209.16 |
| 6,269,854 B1 | 8/2001 | Matsuo et al. | |
| 6,561,244 B2 | 5/2003 | Zanzig et al. | |
| 6,591,879 B1 | 7/2003 | Beckmann et al. | |
| 8,104,523 B2 | 1/2012 | Losi et al. | |
| 2002/0174924 A1 | 11/2002 | Zanzig et al. | |
| 2010/0154948 A1 | 6/2010 | Dahlberg et al. | |
| 2014/0069560 A1 | 3/2014 | Schweitzer et al. | |
| 2014/0069561 A1 | 3/2014 | Dermience et al. | |

FOREIGN PATENT DOCUMENTS

| | | |
|---|---|---|
| EP | 1708896 B1 | 3/2008 |
| EP | 2708382 A1 | 3/2014 |
| JP | 1978-80602 | 7/1978 |
| JP | 1990-249707 | 10/1990 |
| JP | 2009126314 A | 6/2009 |
| WO | 2005063509 A1 | 7/2005 |
| WO | 2015032601 A1 | 8/2014 |

OTHER PUBLICATIONS

EPO machine translation of DE 102010042836, retrieved Oct. 25, 2016.*
European Search report dated Apr. 5, 2016 for Application Serial No. EP15197271.

* cited by examiner

FIG 5

TIRE WITH GROOVE REINFORCEMENT

FIELD OF THE INVENTION

The present invention relates to a tire tread with groove reinforcement. Further, the present invention relates to a tire comprising a tread with groove reinforcement.

BACKGROUND OF THE INVENTION

A pneumatic tire typically includes a tread that contributes a substantial amount to the rolling resistance of the tire. Tread groove deformation may lead to subsequent heat buildup in the tread compound during operation of the tire and vice versa, thereby increasing rolling resistance. Further, groove deformation may have also a negative impact on the tire's performance. In particular, groove deformation may result in an unsatisfactory stiffness of the tire and in an unfavorable contact of the tire with the road.

U.S. Patent Application Publication 2010/0154948 A1 discloses a tire tread with groove reinforcement. In particular, the described tire has at least one circumferential groove separating circumferential ribs wherein each circumferential groove has two sides and a base there between. A reinforcing structure comprising a layer of a compound having reinforcing short fibers oriented between −20 degrees to +20 degrees to the circumferential direction of the tread is secured to the sides of each circumferential groove.

U.S. Pat. No. 6,213,181 B1 discloses a tire having a tread comprising circumferential grooves. The grooves have a groove wall lining for reducing formation of anomalies causing subjective user dissatisfaction. The lining extends over the full height of each groove and is made of a compound different from the compound of the remaining tread. In particular, the compound used for the groove lining is softer than the tread compound used in the remaining tread.

U.S. Pat. No. 8,104,523 discloses a pneumatic tire has a carcass structure having at least one carcass ply and at least one annual reinforcing structure associated with the carcass ply, a tread band made of an elastomeric material at a radially outer position with respect to the carcass structure, a belt structure interposed between the carcass structure and the tread band and a pair of axially opposite side walls on the carcass structure, wherein the tread band has i) at least one first sector, radially extending, substantially of a first elastomeric material; ii) a plurality of second sectors radially extending, positioned at axially opposite sides of the at least one first sector and substantially of a second elastomeric material; iii) at least one longitudinal groove formed in the at least one first sector and extending substantially for the entire circumferential development of the tread band.

U.S. Patent Publication 2014/0069561 discloses a tire tread comprising a plurality of circumferential grooves separating circumferential ribs, each groove comprising a bottom and two sidewalls, and a plurality of laterally separated reinforcements, wherein one reinforcement is arranged adjacent each circumferential groove, and wherein each reinforcement extends from the radially inner surface of the tread in a radial direction at least to the bottom of an adjacent circumferential groove to form the bottom of that groove.

U.S. Patent Publication 2014/0069560 discloses a rubber composition comprising at least one rubber component, between about 50 phr and about 120 phr of a filler, wherein at least 20 phr of the filler is a high surface area carbon black, and 10 phr and 30 phr of a phenolic resin; and a tire tread or a tire comprising such a composition.

SUMMARY OF THE INVENTION

The present invention is directed to a tire tread comprising: a plurality of circumferential grooves separating circumferential ribs, each groove comprising a bottom and two sidewalls; one or more groove reinforcements, each groove reinforcement laterally spaced from any other of said one or more groove reinforcements; wherein each groove reinforcement is arranged adjacent one circumferential groove; wherein at least one circumferential groove has no groove reinforcement adjacent to it; and wherein each groove reinforcement extends from the radially inner surface of the tread in a radially outward direction at least to the bottom of the adjacent circumferential groove to form at least part of the bottom of that groove.

DEFINITIONS

"Apex" or "Bead Filler Apex" means an elastomeric filler located radially above the bead core and between the plies and the turnup plies.

"Axial" and "Axially" mean the lines or directions that are parallel to the axis of rotation of the tire.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Belt Structure" or "Reinforcing Belts" or "Belt" means at least two annular layers or plies of cords, woven or unwoven, underlying the tread.

"Casing" means the carcass, belt structure, beads, sidewalls and all other components of the tire excepting the tread and an undertread, i.e., the whole tire.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Cord" means one of the reinforcement strands, including fibers, with which the plies and belts are reinforced.

"Equatorial Plane" means the plane perpendicular to the tire's axis of rotation and passing through the center of its tread; or the plane containing the circumferential centerline of the tread.

"Lateral" means a direction parallel to the axial direction.

"Normal Load" means the specific design inflation pressure and load assigned by the appropriate standards organization for the service condition for the tire.

"Overlay" means a ply arranged radially on the top of the belt or belt plies. Such overlays are often used for reinforcement of high-speed tires.

"Radial" and "Radially" mean directions radially toward or away from the axis of rotation of the tire.

"Sidewall" means that portion of a tire between the tread and the bead, or, in the context of the present disclosure, also a lateral boundary of a tread groove.

"Tread" means a molded, extruded, or shaped rubber component which, when bonded to a tire casing, includes that portion of the tire that comes into contact with the road when the tire is normally inflated and under normal load.

"Tread width" means the arc length of the tread surface in the plane including the axis of rotation of the tire.

"Undertread" means a layer of rubber placed under an extruded tread to boost adhesion of the tread to the stabilizer plies during tire assembly and preferably to cover the end of the cut belts.

BRIEF DESCRIPTION OF THE DRAWINGS

The structure, operation, and advantages of the invention will become more apparent upon contemplation of the following description taken in conjunction with the accompanying drawings, wherein.

DETAILED DESCRIPTION OF THE EMBODIMENTS

There is disclosed a tire tread comprising: a plurality of circumferential grooves separating circumferential ribs, each groove comprising a bottom and two sidewalls; one or more groove reinforcements, each groove reinforcement laterally spaced from any other of said one or more groove reinforcements; wherein each groove reinforcement is arranged adjacent one circumferential groove; wherein at least one circumferential groove has no groove reinforcement adjacent to it; and wherein each groove reinforcement extends from the radially inner surface of the tread in a radially outward direction at least to the bottom of the adjacent circumferential groove to form at least part of the bottom of that groove.

There is further disclosed a pneumatic tire comprising the tire tread.

Figures 1, 1A, 1B:
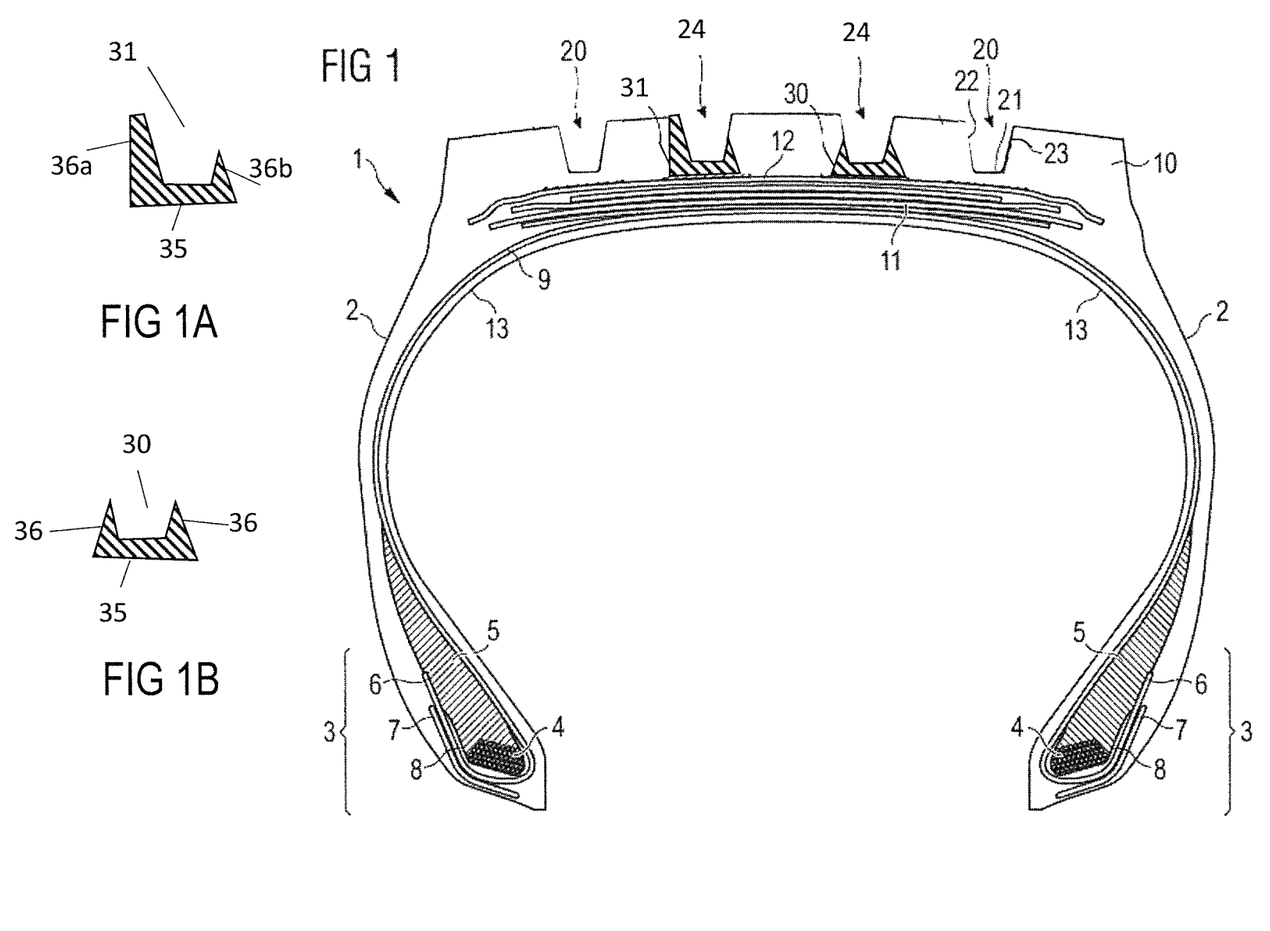
FIG. 1 represents a schematic cross section through a tire comprising groove reinforcements according to a first aspect of the present invention.
FIG. 1A represents a detail of a groove reinforcement from FIG. 1.
FIG. 1B represents a detail of a groove reinforcement from FIG. 1.

FIG. 1 shows a schematic cross section of a tire 1 according to a preferred embodiment of the invention. The tire 1 has a tread 10, an inner liner 13, a belt structure 11 comprising four belts, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. The carcass ply 9 includes a pair of axially opposite end portions 6, each of which is secured to a respective one of the beads 4. Each axial end portion 6 of the carcass ply 9 is turned up and around the respective bead 4 to a position sufficient to anchor each axial end portion 6. The carcass ply 9 may be a rubberized ply having a plurality of substantially parallel carcass reinforcing members made of such material as polyester, rayon, or similar suitable organic polymeric compounds. The turned up portions 6 of the carcass ply 9 may engage the axial outer surfaces of two flippers 8 and axial inner surfaces of two chippers 7. As shown in FIG. 1, the example tread 10 has circumferential grooves 20, 24 each essentially defining a U-shaped opening in the tread 10. The main portion of the tread 10 may be formed of a tread compound, which may be any suitable tread compound or compounds. Each circumferential groove 20, 24 is defined by a bottom 21 or base laterally separating a pair of radially extending walls 22, 23.

An area adjacent to each groove 24 comprises a groove reinforcement 30, 31. Grooves 20 have no groove reinforcement. The groove reinforcement 30, 31 may consist of a rubber compound or thermoplastic polymers which have a higher hardness than the compound of the remaining tread 10. Non-limiting examples of respective compounds are given below. Examples for respective thermoplastic polymers are also given below. As seen in FIG. 1, the groove reinforcement 30, 31 or reinforcing area 30, 31 forms at least a part of the groove's 24 sidewalls 22, 23 and of the base or bottom 21 of the groove 24. In particular and as seen in FIGS. 1A and 1B, each depicted reinforcement 30, 31 includes two radially extending portions, which form at least partially the opposing sidewalls 22, 23 of an adjacent groove 24. Reinforcement 30 is a symmetric reinforcement, as the portions 36 extend radially to the same extent. Reinforcement 31 is an asymmetric reinforcement, at the portion 36a extend further radially than does the portion 36b. Further, in the depicted example, each reinforcement 30, 31 has a radially inner base portion 35 which is in (direct) contact with a supporting structure radially under the tread 10. For example such a structure may be the overlay 12 as shown in FIG. 1. Alternatively, such a structure may, for example, be a radially outermost belt ply or an undertread. As depicted in FIG. 1, each groove 24 has its own reinforcing area 30, 31 wherein the reinforcements 30, 31 adjacent the different grooves 24 are distinct with respect to the lateral direction. As mentioned already above, the remaining tread 10 may be made of any suitable or common tread compound(s).

In the embodiment shown in FIGS. 1, 1A, and 1B, the shape of portions 36, 36a, 36b of the reinforcements 30, 31 tapers in the outer radial direction. Thus, the groove reinforcements 30, 31 have the ability to improve the stability of the bottoms 21 of the grooves 24 but do not provide large amounts of reinforcement material in the tread blocks or ribs which might contact the road. However, in general it is also possible that the reinforcement tapers in the opposite direction or extends with parallel sides, i.e. without taper, in the radial direction. As seen in FIG. 1B, the height of a symmetric reinforcement 30 in each of its radially extending portion 36 extends from a radially inner base portion 35 (at the radially inner surface of the tread 10) to about half of the depth of the adjacent groove 24. As seen in FIG. 1A, the height of asymmetric reinforcement 31 in portion 36a extends radially to the radially outer surface of tread 10, while the height of portion 36b extends radially to about half the depth of the adjacent groove 24. In general, the radially extending portions 36, 36a, 36b of reinforcements 30, 31 may extend at least to the bottom 21 of groove 24, but may extend to the radially outer surface of the tread 10 with the understanding that portions 36a, 36b extend radially to different extents.

Alternatively, the reinforcement may extend in the radial direction to at least the inner quarter of the sidewalls 22, 23 and to at most the inner three-quarters of the sidewalls 22, 23 to form the sidewalls in that area.

The lateral width of a reinforcement 30, 31 at its radially inner base portion may preferably be between 1.1 and 4.0 times larger than the axial width of the adjacent groove's 20 bottom 21. Such a relative width may provide further stiffness and support for the adjacent groove 24.

Figure 2:
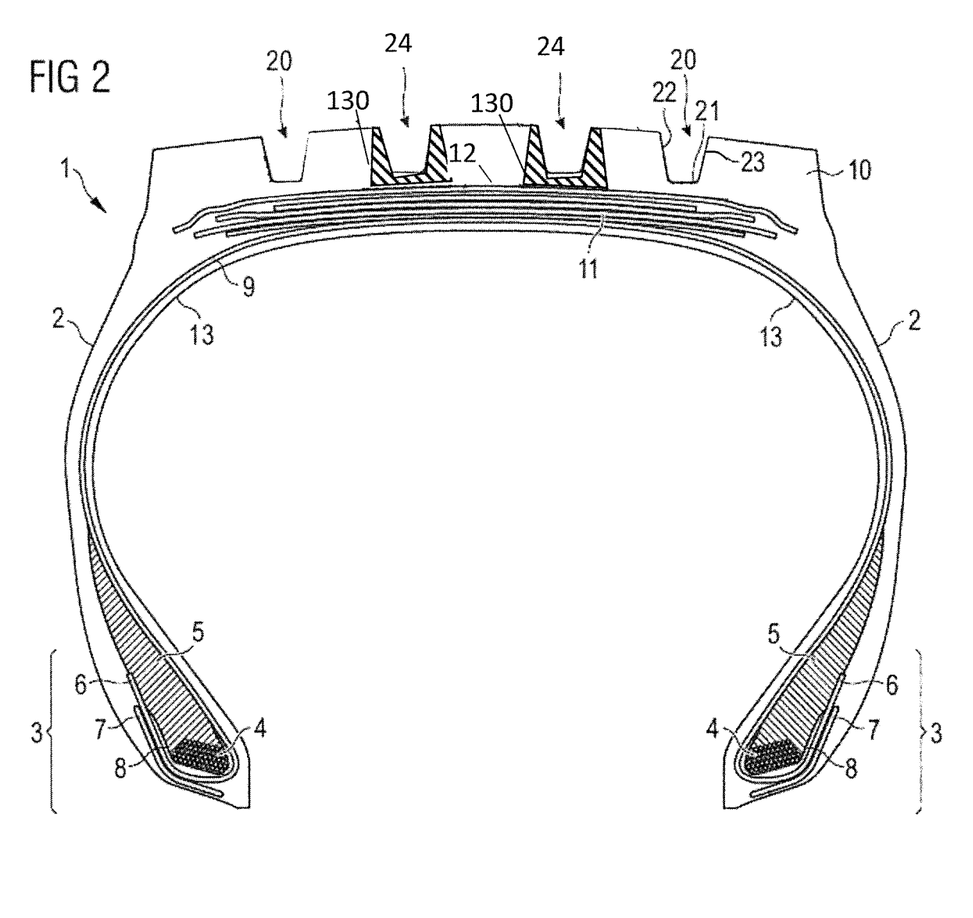
FIG. 2 represents a schematic cross section through a tire comprising groove reinforcements according to a second aspect of the present invention.
Figure 2A:
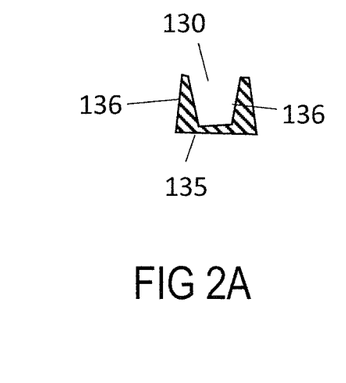
FIG. 2A represents a detail of a groove reinforcement from FIG. 2.

FIGS. 2, 2A show another embodiment of a tire 1 and a tread 10 according to the present invention in which laterally distinct reinforcements 130 extend from the overlay 12 in a radial direction to the sidewalls 22, 23 of the grooves 24. The depicted symmetric groove reinforcement 130 has again a tapering shape extending from a radially lower base portion 135 to a narrower upper portion 136. In the present embodiment the symmetric groove reinforcement 130 extends from the radially inner surface of the tread 10 to the radially outer surface of the tread 10. Thus, both sidewalls 22, 23 and also the bottom 21 of each groove 24 are formed or provided by the reinforcement 130.

The sidewalls 22, 23 of the reinforcing material in contact with the remaining tread or tread compound may have a variety of shapes. The sidewalls of the reinforcing material may have straight shape (as e.g. depicted in FIG. 1) or convex or concave shapes (not shown).

Figures 3, 3A, 3B:
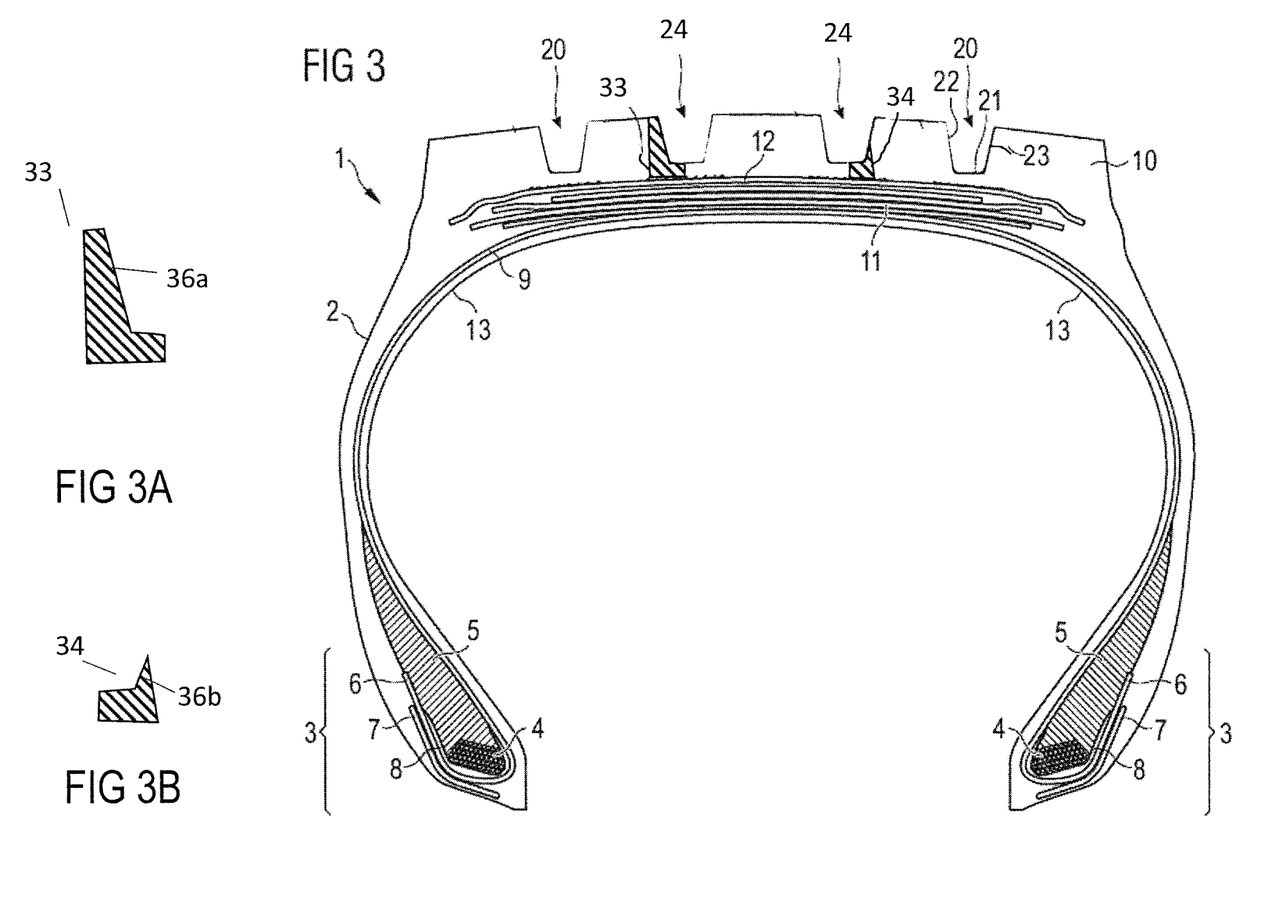
FIG. 3 represents a schematic cross section through a tire comprising groove reinforcements according to a third aspect of the present invention.
FIG. 3A represents a detail of a groove reinforcement from FIG. 3.
FIG. 3B represents a detail of a groove reinforcement from FIG. 3.

FIGS. 3, 3A, 3B depict a further preferred embodiment of a tire 1 and a tread 10 according to the present invention. In the shown cross section, each asymmetric groove reinforcements 33, 34 extend radially on only one side of adjacent groove 24 and form only half of the base of the groove 24. The asymmetric groove reinforcement 33 extends radially in portion 36a to the radially outer surface of tread 10 along only one sidewall of groove 24. The asymmetric groove reinforcement 34 extends radially in portion 36b along only one sidewall only to about half of the depth of the adjacent groove 24.

Figure 4:
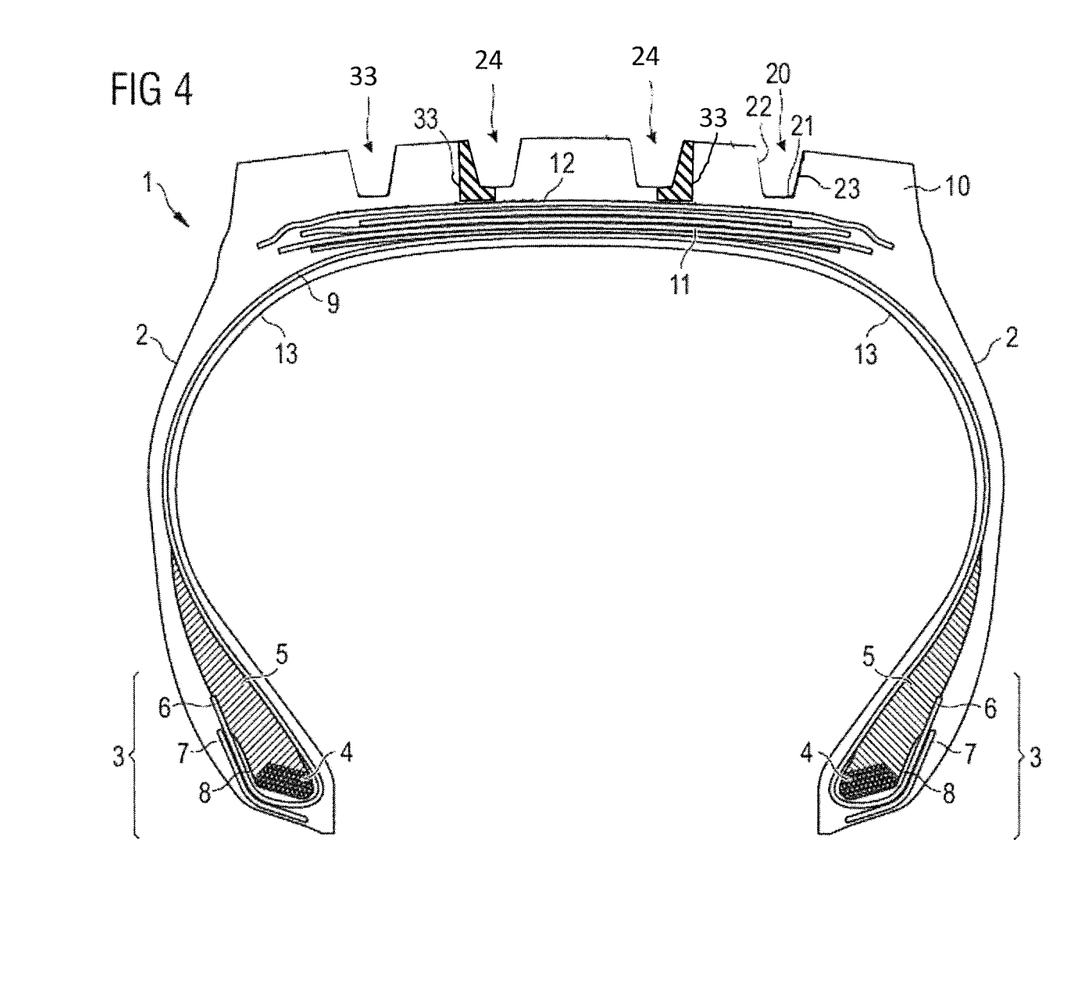
FIG. 4 represents a schematic cross section through a tire comprising groove reinforcements according to a fourth aspect of the present invention.

FIG. 4 depicts a further preferred embodiment of a tire 1 and a tread 10 according to the present invention. In the shown cross section, each of two asymmetric groove reinforcements 33 extend radially on only one side of adjacent groove 24, and forms only half of the base of the groove 24. The asymmetric groove reinforcement 33 extends radially to the radially outer surface of tread 10 along only one sidewall of groove 24.

Figure 5:
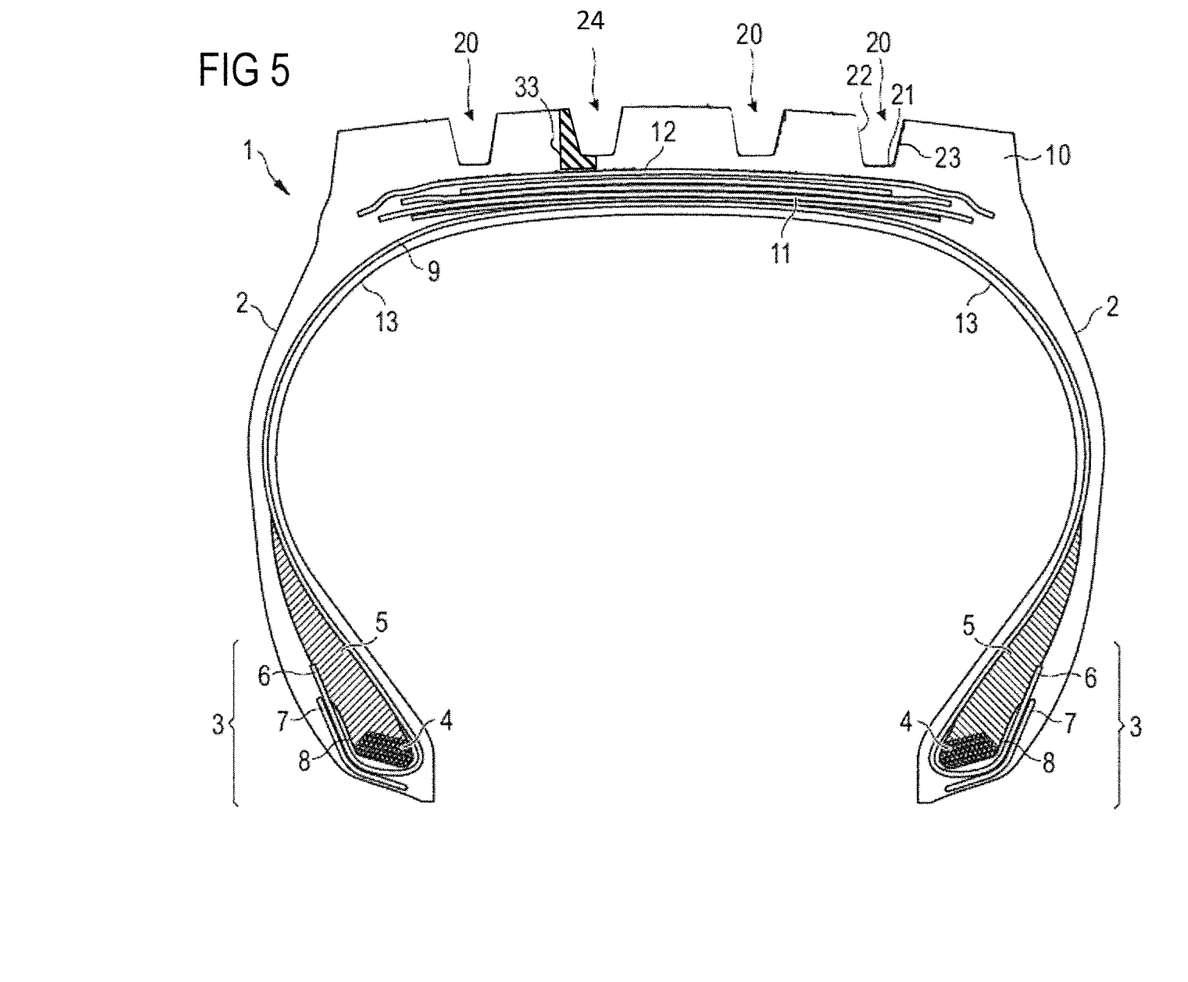
FIG. 5 represents a schematic cross section through a tire comprising groove reinforcements according to a fifth aspect of the present invention.

FIG. 5 depicts a further embodiment of a tire 1 and a tread 10 according to the present invention. In the shown cross section, a single asymmetric groove reinforcements 33 extends radially on only one side of adjacent groove 24, and forms only half of the base of the groove 24. The asymmetric groove reinforcement 33 extends radially to the radially outer surface of tread 10 along only one sidewall of groove 24.

The tire 1 according to the above embodiments has been shown with four circumferential grooves 20, 24. However, the tire 10 may have more or less of such grooves 20, 24. Further, the tire has been depicted with four belt plies and an overlay 12. Such an overlay 12 is merely an optional feature. Furthermore, the number of belt plies may be higher or lower. For example the tire may have two belt plies only.

In general it is possible to provide reinforcement described herein also to lateral grooves. However, if the reinforcements are applied to circumferential grooves 24, it is possible to extrude the groove reinforcements 30, 31, 33, 34, 130 together with the remaining tread 10 or tread compound(s). Thus, a tread 10 comprising a reinforcement 30, 31, 33, 34, 130 according to the present invention may be easily, cost-effectively and quickly produced.

In one embodiment, the reinforcement consists of a rubber composition, the rubber composition comprising between about 50 phr and 120 phr of a filler, wherein at least 20 phr of the filler is a high surface area carbon black, and between 10 phr and 30 phr of a phenolic resin. The filler may consist only of high surface area carbon black. The rubber composition may comprise 100 parts of at least one rubber component, such as natural rubber, polybutadiene, styrene-butadiene copolymer or other polymers. Alternatively, the reinforcement may comprise also or consist only of polymer reinforced rubbers and/or thermoplastic polymers. For example, thermoplastic polymers may be chosen from the groups of polyamides, polyesters, polyimides or from the group of polyesters and polyamides. The polyamides may be, for example, polyamides 4-6, 6, 6-6, 11 or 12. Polyesters may be, for example, PET (polyethylene terephthalate), PEN (polyethylenenaphthalate), PBT (polybutylene terephthalate), PBN (polybutylenenaphthalate), PPT (polypropylene terephthalate), PPN (polypropylenenapthalate). A further example of a possible thermoplastic polyester elastomer is a material sold under the name "Hytrel®" by DuPont™.

Below TABLE 1 gives non-limiting examples of rubber compositions which, for example, may be used as material of the reinforcements 30, 31, 33, 34, 130.

TABLE 1

| EXAMPLE 1 | | EXAMPLE 2 | | EXAMPLE 3 | | EXAMPLE 4 | |
| --- | --- | --- | --- | --- | --- | --- | --- |
| phr | Material | phr | Material | phr | Material | phr | Material |
| 80 | Natural rubber | 45 | Natural rubber | 80 | Thio-functionalized high vinyl SSBR | 80 | Natural rubber |
| 20 | Polybutadiene | 55 | Polybutadiene | 20 | Polybutadiene | 20 | Polybutadiene |
| 50 | N191 grade carbon black | 60 | N134 grade carbon black | 60 | N191 grade carbon black | 70 | N191 grade carbon black |
| 20 | Silica | 0 | Silica | 20 | Silica | 20 | Silica |
| 15 | TDAE Oil | 0 | TDAE Oil | 20 | TDAE Oil | 35 | TDAE Oil |
| 2 | Bis(triethoxysilyl-propyl)disulfan | 0 | Bis(triethoxysilyl-propyl)disulfan | 2 | Bis(triethoxysilyl-propyl)disulfan | 2 | Bis(triethoxysilyl-propyl)disulfan |
| 2 | Fatty acid soap | 0 | Fatty acid soap | 2 | Fatty acid soap | 2 | Fatty acid soap |
| 3 | Stearic acid | 3 | Stearic acid | 3 | Stearic acid | 3 | Stearic acid |
| 1.5 | Wax | 1.5 | Wax | 1.5 | Wax | 1.5 | Wax |
| 3 | Hexamethylene-tetramine | 5.6 | Hexamethylene-tetramine | 3 | Hexamethylene-tetramine | 3.8 | Hexamethylene-tetramine |

TABLE 1-continued

| EXAMPLE 1 | | EXAMPLE 2 | | EXAMPLE 3 | | EXAMPLE 4 | |
|---|---|---|---|---|---|---|---|
| phr | Material | phr | Material | phr | Material | phr | Material |
| 3 | Antioxidants | 3 | Antioxidants | 3 | Antioxidants | 3 | Antioxidants |
| 20 | Novolac type resin | 10 | Novolac type resin | 20 | Novolac type resin | 25 | Novolac type resin |
| 1.6 | Sulfur | 1.6 | Sulfur | 1.6 | Sulfur | 1.3 | Sulfur |
| 2.5 | Zinc oxide | 2.5 | Zinc oxide | 2.5 | Zinc oxide | 2.5 | Zinc oxide |
| 0.3 | N-Cyclohexyl-thiophthalimide | 0 | N-Cyclohexyl-thiophthalimide | 0.3 | N-Cyclohexyl-thiophthalimide | 0.3 | N-Cyclohexyl-thiophthalimide |
| 2.4 | N,N'-dicyclo-hexyl-2-bezo-thiazolesulfenamide | 1.8 | N-cyclohexyl-2-benzothiazole-sulfenamide | 1.6 | N-cyclohexyl-2-benzothiazole-sulfenamide | 2.4 | N,N'-dicyclo-hexyl-2-bezo-thiazolesulfenamide |

The compositions according to the above mentioned Examples 1 to 4 given in above TABLE 1 comprise all natural rubber, polybutadiene and/or styrene-butadiene copolymer. However, other polymers could be used instead. Further, N191 or N134 grade carbon black is given in the above examples. However, carbon black having other grades could be used, as for example, other N1 and N2 series carbon blacks. The combination of a high surface area carbon black and a large amount of reinforcing resin results in high hardness (e.g. a Shore A hardness over 80) and high elongation at break (e.g. more than 300%). Although a high Shore A hardness may be known for some other rubber compositions like those for apexes, it is not known in the state of the art to produce the above mentioned combination. In particular, it is preferable that the carbon black has a high surface area with an iodine adsorption number of at least about 100 g/kg or preferably at least 180 g/kg. As known in the art, the iodine adsorption number is a measure of the surface area of carbon black which is high in the present case.

According to Examples 1 to 4 silica has been used in the composition between 0 phr and 20 phr. Preferably the silica has a BET surface area of at least 100 $m^2/g$ or more preferably of at least 180 $m^2/g$. The definition of the BET surface area is also well-known to the person skilled in the art.

Further, some of the suggested tire compositions comprise parts of TDAE Oil. The amount of that component may also vary. Moreover, it may be replaced by alternative substances, as for example by MES, RAE, naphthenic oil, vegetable oil, or other plasticizers.

According to the above examples a Novolac type resin is used. However, other non-self curing phenolic resins could be used. According to the above examples the resin is cross-linked using hexamethylene tetramine or hexamethoxymethylmelamine. However, other cross-linking agents could be used as well.

The further components listed with amounts of less than 5 phr constitute components which are common in multiple rubber compositions and may vary as known to a person skilled in the art. For example, other silanes could be used instead of the mentioned Bis(triethoxysilylpropyl)disulfan, e.g. bis(3-triethoxysilylpropyl)tetrasulfide, Evonik Si363 from "Evonik", NXT, NXT Z100, NXT Z60, NXT Z45 from "Momentive Performance Materials". Instead of N-Cyclohexylthiophthalimide other prevulcanization inhibitors may be used. Further, N,N'-dicyclohexyl-2-benzothiazolesulfenamide could e.g. be replaced by other known accelerators.

Tests of the inventors have shown that the above compositions have each a Shore A hardness >80. In other words, the reinforcing composition is considerably harder than common tread compounds. Further, the inventors have tested the elongation at break which is indeed larger than 300%.

A composition having a high Shore A hardness, as e.g. suggested in Examples 1-4, may on the one hand provide stability and a high cornering stiffness to the tire 1, if provided adjacent the grooves 20 as described herein above. On the other hand, a high elongation at break provides durability and crack resistance to the tread 10 in the region of the grooves 24.

As mentioned above, tire components having a high Shore A hardness, as e.g. apexes may be known. However, such components have a considerably lower elongation at break (e.g. less than 150%).

The present invention may be used for any type of tire, e.g. for passenger car tires, especially sports vehicle tires, truck tires or airplane tires. The tires may be pneumatic or non-pneumatic.

Variations in the present invention are possible in light of the description. While certain representative example embodiments, examples and details have been shown for the purpose of illustrating the subject invention, it will be apparent to those skilled in this art that various changes and modifications can be made therein without departing from the scope of the subject invention. It is, therefore, to be understood that changes may be made in the particular example embodiments described which will be within the fully intended scope of the invention as defined by the following appended claims.

In any case the above described embodiments and examples shall not be understood in a limiting sense. In particular, the features of the above embodiments may also be replaced or combined with one another.

The invention claimed is:
1. A tire comprising a tread comprising:
a plurality of circumferential grooves separating circumferential ribs, each groove comprising a bottom and two sidewalls;
one or more groove reinforcements, each groove reinforcement laterally spaced from any other of said one or more groove reinforcements;
wherein each groove reinforcement is arranged adjacent one circumferential groove;
wherein at least one circumferential groove has no groove reinforcement adjacent to it; and
wherein each groove reinforcement extends from the radially inner surface of the tread in a radially outward direction at least to the bottom of the adjacent circumferential groove to form at least part of the bottom of that groove;

wherein the groove reinforcement consists of a rubber composition, the rubber composition comprising:

between about 50 phr and 120 phr of a filler, wherein at least 20 phr of the filler is a high surface area carbon black having an iodine adsorption number of at least 100 g/kg; and between 10 phr and 30 phr of a phenolic resin.

2. The tire of claim 1, wherein at least one groove reinforcement is an asymmetric groove reinforcement and extends in the radial direction to form at least part of at least one sidewall of the adjacent groove, a part of the asymmetric groove reinforcement on one sidewall extending radially further than any part of the asymmetric groove reinforcement on the other sidewall.

3. The tire of claim 1, the tread further comprising a radially innermost tread base, where each groove reinforcement extends from the radially outer surface of the tread base in a radially outward direction at least to the bottom of the adjacent circumferential groove to form at least part of the bottom of that groove.

4. The tire of claim 3, wherein each groove reinforcement extends from the radially inner surface of the tread base.

5. The tire according to claim 1, wherein each groove reinforcement forms the bottom of an adjacent groove and extends further in the radial direction to form at least the radially inner quarter and at most the radially inner three-quarters of the sidewalls of that groove.

6. The tire according to claim 1, wherein the lateral sides of each groove reinforcement has one of the following shapes: convex, concave, straight or step-like.

7. The tire according to claim 1, wherein the rubber composition has a higher stiffness than the rubber composition or rubber compositions in the remaining tread.

8. A tire comprising a tread comprising:

a plurality of circumferential grooves separating circumferential ribs, each groove comprising a bottom and two sidewalls;

one or more groove reinforcements, each groove reinforcement laterally spaced from any other of said one or more groove reinforcements;

wherein each groove reinforcement is arranged adjacent one circumferential groove;

wherein at least one circumferential groove has no groove reinforcement adjacent to it;

wherein each groove reinforcement extends from the radially inner surface of the tread in a radially outward direction at least to the bottom of the adjacent circumferential groove to form at least part of the bottom of that groove; wherein each groove reinforcement consists of a rubber composition or of a thermoplastic material having a Shore A hardness of more than 80 and an elongation at break of at least 300%.

9. The tire of claim 1, wherein the high surface area carbon black has an iodine adsorption number of at least 200 g/kg.

10. The tire of claim 1, wherein at least 10 phr of the filler is a high surface area silica having a BET surface area of at least 150 m$^2$/g.

11. The tire according to claim 10, wherein the high surface area silica has a BET surface area of at least 200 m$^2$/g.

12. The tire according to claim 1, wherein the rubber composition comprises at least 15 phr of the phenolic resin.

13. The tire of claim 8, wherein at least one groove reinforcement is an asymmetric groove reinforcement and extends in the radial direction to form at least part of at least one sidewall of the adjacent groove, a part of the asymmetric groove reinforcement on one sidewall extending radially further than any part of the asymmetric groove reinforcement on the other sidewall.

14. The tire of claim 8, the tread further comprising a radially innermost tread base, where each groove reinforcement extends from the radially outer surface of the tread base in a radially outward direction at least to the bottom of the adjacent circumferential groove to form at least part of the bottom of that groove.

15. The tire of claim 14, wherein each groove reinforcement extends from the radially inner surface of the tread base.

16. The tire of claim 8, wherein each groove reinforcement forms the bottom of an adjacent groove and extends further in the radial direction to form at least the radially inner quarter and at most the radially inner three-quarters of the sidewalls of that groove.

17. The tire according to claim 8, wherein the lateral sides of each groove reinforcement has one of the following shapes: convex, concave, straight or step-like.

18. The tire according to claim 8, wherein the rubber composition or thermoplastic material have a higher stiffness than the rubber composition or rubber compositions in the remaining tread.

* * * * *